United States Patent [19]
Yamashita et al.

[11] Patent Number: 6,137,835
[45] Date of Patent: *Oct. 24, 2000

[54] PICTURE CODING APPARATUS USING ORTHOGONAL TRANSFORMS

[75] Inventors: Shinichi Yamashita, Yokohama; Koji Takahashi, Chigasaki; Kazuhiko Haruma, Tokyo; Nobukuni Roppongi, Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/920,865

[22] Filed: Aug. 29, 1997

Related U.S. Application Data

[63] Continuation of application No. 08/341,942, Nov. 16, 1994, abandoned.

[30] Foreign Application Priority Data

Nov. 16, 1993 [JP] Japan .................................... 5-286880
Nov. 17, 1993 [JP] Japan .................................... 5-288274

[51] Int. Cl.$^7$ ...................................................... H04N 7/18
[52] U.S. Cl. .......................... 375/240; 348/405; 348/404; 348/403; 348/402
[58] Field of Search ..................................... 348/384, 402, 348/403, 404, 395, 405, 406, 407, 420, 421, 398; 375/240

[56] References Cited

U.S. PATENT DOCUMENTS

| | | |
|---|---|---|
| 4,047,221 | 9/1977 | Yasuda et al. ............................ 348/419 |
| 4,780,760 | 10/1988 | Waldman et al. ........................ 348/419 |
| 4,897,855 | 1/1990 | Acampora ................................ 348/419 |
| 5,107,348 | 4/1992 | Citta et al. ................................ 348/398 |
| 5,122,874 | 6/1992 | Lhuillier et al. ......................... 348/415 |
| 5,128,754 | 7/1992 | Dhein ....................................... 348/398 |
| 5,278,647 | 1/1994 | Hingorani et al. ....................... 348/397 |
| 5,299,019 | 3/1994 | Pack et al. ............................... 358/261 |
| 5,313,203 | 5/1994 | Suu et al. ................................... 341/50 |
| 5,327,241 | 7/1994 | Ishizu et al. ............................. 348/606 |
| 5,398,078 | 3/1995 | Masuda et al. .......................... 348/699 |
| 5,412,428 | 5/1995 | Tahara ...................................... 348/396 |
| 5,418,569 | 5/1995 | Ando ........................................ 348/415 |
| 5,422,736 | 6/1995 | Katayama ................................ 348/419 |
| 5,479,211 | 12/1995 | Waldman et al. ....................... 348/405 |
| 5,485,533 | 1/1996 | Hatano et al. ........................... 348/420 |
| 5,543,845 | 8/1996 | Asamura et al. ........................ 348/407 |
| 5,612,748 | 3/1997 | Gohshi et al. ........................... 348/424 |
| 5,627,590 | 5/1997 | Hamano et al. ......................... 348/402 |
| 5,627,916 | 5/1997 | Horiuchi .................................. 382/239 |
| 5,642,460 | 6/1997 | Shimoda .................................. 386/124 |
| 5,677,735 | 10/1997 | Ueno et al. .............................. 348/415 |

*Primary Examiner*—Andy Rao
*Attorney, Agent, or Firm*—Fitzpatrick, Cella, Harper & Scinto

[57] ABSTRACT

A picture coding apparatus includes a first compressing device for offset sampling input signals, and a second compressing device, having at an orthogonal transform circuit and a quantization device, for compressing the output from the first compressing device, wherein the quantization levels of the quantization device are set so that high-frequency components along a predetermined direction are quantized precisely on the basis of the visibility of each frequency component discriminated by orthogonal transform on a display screen.

12 Claims, 14 Drawing Sheets

FIG. 4(B)

FOSS 8×8DCT
Q COEFFICIENT MATRIX

FIG. 4(A)

ORDINARY 8×8DCT
Q COEFFICIENT MATRIX

1st FIELD

FIG. 14(a)

2nd FIELD
(TABLE - 1)

FIG. 14(b)

2nd FIELD
(TABLE - 2)

FIG. 14(c)

2nd FIELD
(TABLE - 3)

PICTURE CODING APPARATUS USING ORTHOGONAL TRANSFORMS

This application is a continuation, of pplication Ser. No. 08/341,942 filed Nov. 16, 1994, now abandoned.

BACKGROUND OF THE INVENTION

1. Field of the Invention

The present invention relates to a picture coding apparatus for encoding various signals, such as video signals, with a high degree of efficiency by using orthogonal transform.

2. Description of the Related Art

Hitherto, as a technology for encoding video signals with a high degree of efficiency, technology employing orthogonal transform, adaptive quantization and variable-length encoding has been generally known.

In this technology, input video signals are discriminated into frequency components by orthogonal transform such as DCT, and a value (a DCT coefficient) such that those frequency components quantized by a predetermined quantization level, is assigned with a code of an appropriate code length so that picture coding is performed.

In such technology, it is noted that an ordinary subject has relatively small high-frequency components, and that the visual characteristic of the human being is relatively insensitive to high-frequency components in comparison to low-region components. The quantization level with respect to each frequency component discriminated by the above-described orthogonal transform is variably set according to the visual importance and the occurrence probability so that a high-efficiency compression is realized by adaptive quantization such that the frequency components in the low region which are more important are precisely quantized, and the frequency components in the high region which are less important are roughly quantized, and by variable-length encoding such that a short code length is assigned to a DCT coefficient having a high occurrence probability.

The above-described technology, as a technology for realizing high-efficiency compression, is used in digital VTRs for digitizing and recording video signals, or the like. A commercial digital VTR, for example, is capable of compressing video signals (standard definition (SD)) of approximately 160 Mbps in conformity with the current NTSC system to approximately 25 Mbps, i.e., by approximately one-sixth.

Also, since such picture coding using DCT transform is basically an intra-frame encoding, it is particularly suitable for digital VTRs. As described above, in a digital VTR, the above-described encoding is sufficient for a method of compressing video signals (SD) in conformity with the current NTSC system.

However, video signals (high definition (HD)) in conformity with the next television system have a considerably wide signal band, and therefore the amount of data is as large as approximately 1.2 Gbps. Thus, the above-described compression method is not sufficient, which is problematical.

SUMMARY OF THE INVENTION

The present invention has been achieved in view of the above-described circumstances.

It is an object of the present invention to provide a still higher-level picture coding apparatus.

To achieve the above-described object, according to one aspect of the present invention, there is provided a picture coding apparatus, comprising: first compressing means for offset-sampling input signals; and second compressing means, having at least orthogonal transform and quantization means, for compressing the output from the first compressing means, wherein the quantization level of the quantization means is set so that high-frequency components along a predetermined direction are quantized precisely on the basis of the visibility of each frequency component discriminated by orthogonal transform on a display screen.

In the above-described picture coding apparatus in accordance with the present invention, the reading scan in the orthogonal transform means is set on the basis of the quantization level.

According to another aspect of the present invention, there is provided a picture coding apparatus, comprising: filtering means for limiting input signals to a predetermined band; compressing means for offset-sampling signals obtained via the filtering means; encoding means for encoding signals obtained via the compressing means; and movement detecting means for detecting the movement of the input signals, wherein the pass band in the filtering means is set on the basis of the output detected by the detecting means.

According to the picture coding apparatus having the above-described construction, signals compressed by the first compressing means for offset-sampling input signals are compressed by second compressing means. Thus, even more highly efficient compression can be realized.

Also, since the quantization level of quantization means in the second compressing means is set according to the visibility of the image, predetermined high-frequency components caused by offset-sampling can be stored without being lost in the quantization step. Thus, it is possible to secure sharpness of the reproduced image in spite of the fact that high-efficiency compression is performed.

According to the present invention, since the quantization level is low and the DCT coefficient with a narrow quantization step width is read out with the highest priority, the later the read out, the greater the probability becomes that the coefficient after quantization will be "0". Thus, it is possible to increase the compression rate in the variable-length encoding in later steps.

According to the present invention, since the band of the filtering means is variably set depending upon the presence of movement, it is possible to increase the image quality of the encoded signals when there is movement.

According to a further aspect of the present invention, there is provided a picture coding apparatus, comprising: sampling means for sub-sampling input digital image signals; and encoding means for encoding the signals by selectively switching a first encoding mode in which the image signals are compressed and encoded by a differential signal such that a prediction value is subtracted from the sub-sampled image signals, and a second encoding mode in which the image signals are compressed and encoded without using the differential signal.

According to the present invention, it is possible to realize picture coding of image signals while maintaining high image quality.

The above and further objects, aspects and novel features of the invention will more fully appear from the following detailed description when read in connection with the accompanying drawings. It is to be expressly understood, however, that the drawings are for the purpose of illustration only and are not intended to limit the invention.

BRIEF DESCRIPTION OF THE DRAWINGS

FIG. 4(A) illustrates an ordinary quantization table;

FIG. 4(B) illustrates quantization levels in accordance with the present invention;

FIGS. 14(a), 14(b) and 14(c) are illustrations of a quantization table of image data of the second field in accordance with the embodiment of the present invention.

DETAILED DESCRIPTION OF THE PREFERRED EMBODIMENTS

Preferred embodiments of a picture coding apparatus of the present invention will be explained below with reference through FIGS. 1 to 8.

Figure 1:
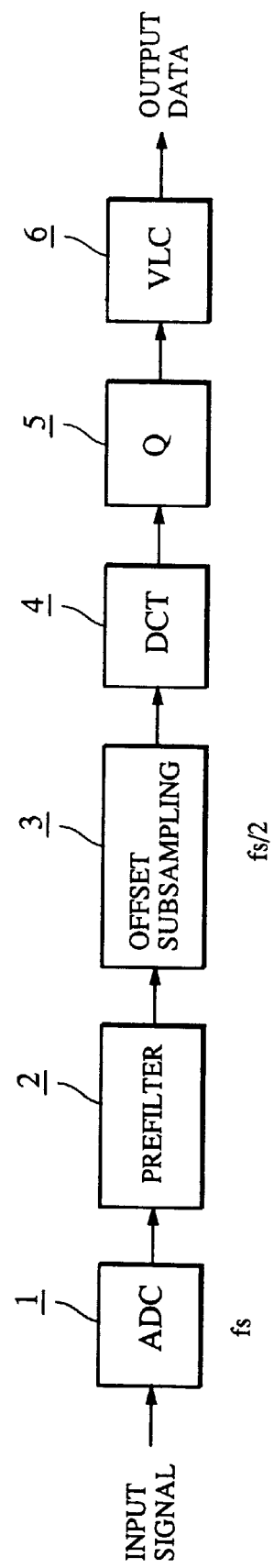
FIG. 1 is a block diagram illustrating an embodiment of a picture coding apparatus in accordance with the present invention.

FIG. 1 is a block diagram illustrating an embodiment of a picture coding apparatus in accordance with the present invention. The picture coding apparatus of this embodiment comprises an A/D converter 1, a prefilter 2, an offset-sub-sampling circuit 3, a DCT circuit 4, an adaptive quantization circuit 5, and a variable-length encoding circuit 6.

Input signals in this embodiment are filtered to a predetermined band and supplied to the A/D converter 1 where the signals are digitized by a sampling frequency ($f_S$). The output from the prefilter 2 is supplied to the offset-sub-sampling circuit 3. The prefilter 2 stores oblique high-frequency components. Thus, aliasing generated by sub-sampling performed by the subsampling circuit 3 is prevented. Also, the prefilter 2 supress n,R horizontal and vertical high-frequency components which are visually sensitive.

Figure 2:
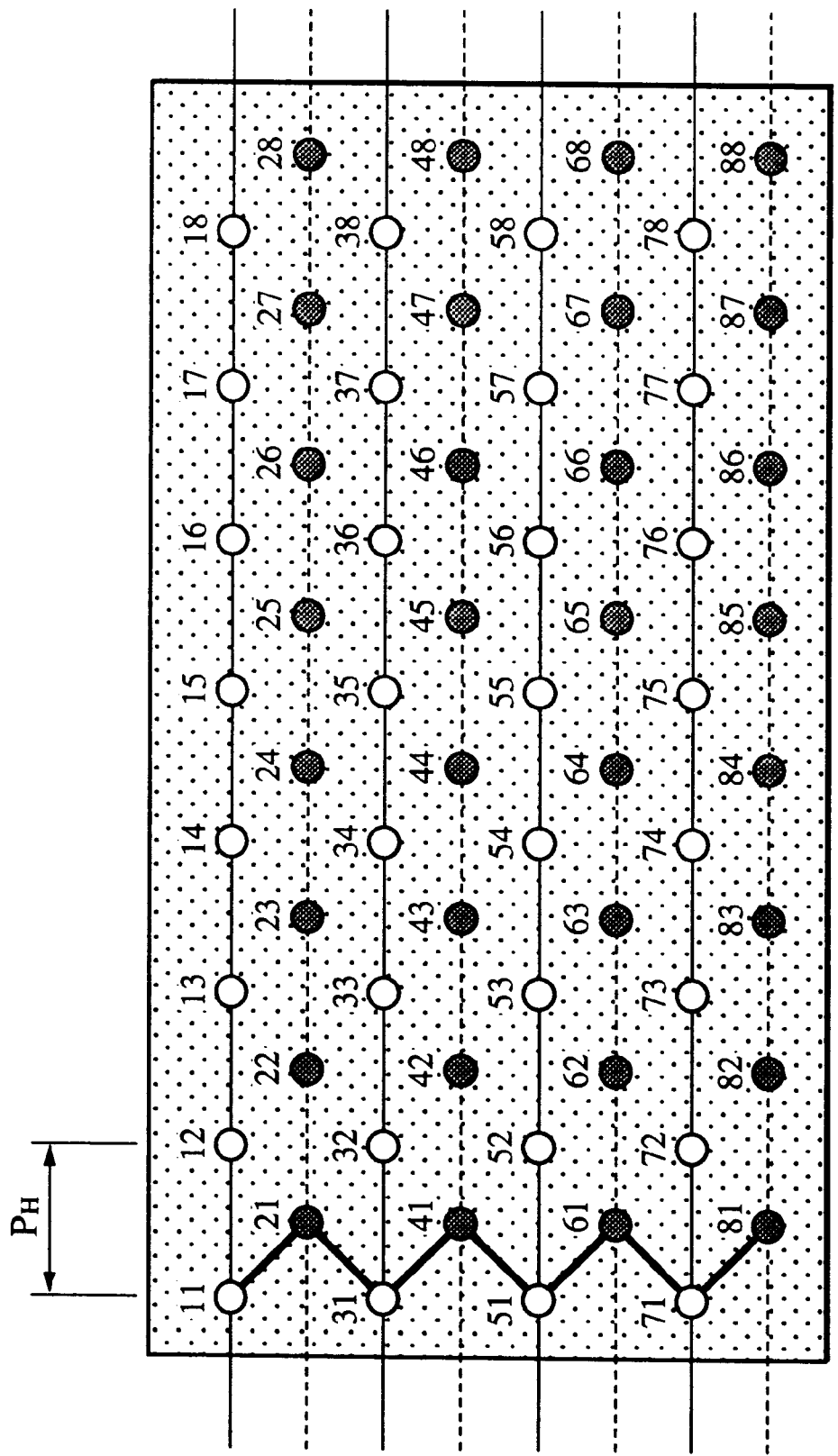
FIG. 2 is an illustration of the arrangement of offset-sampled pixels.
Figure 3:
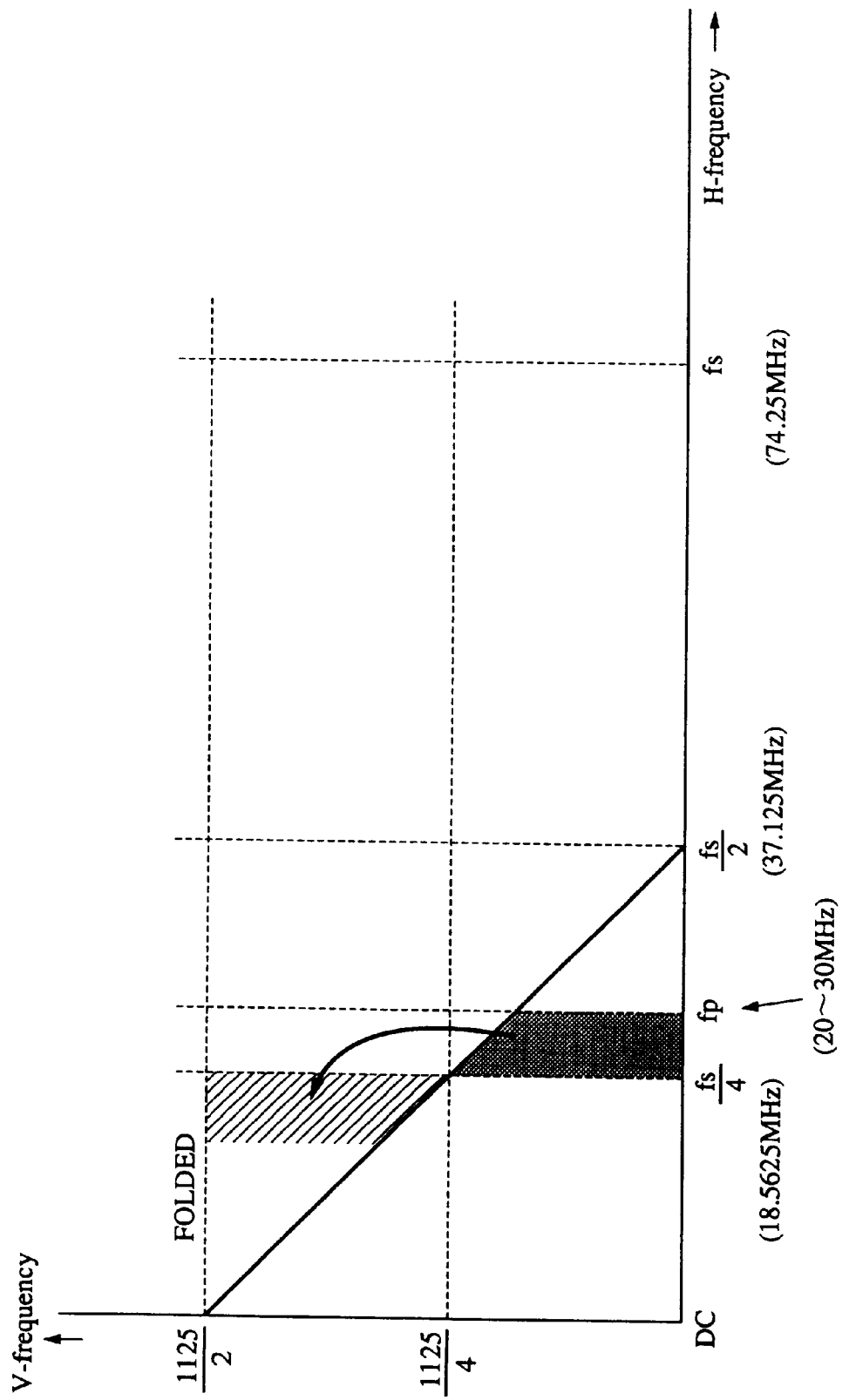
FIG. 3 is a two-dimensional spatial frequency characteristic diagram of the apparatus of FIG. 1.

The offset-sub-sampling circuit 3 compresses the amount of data of input signals to about one half by offset-sub-sampling supplied video signals by a sub-sampling frequency of $f_S/2$. In the offset-sub-sampling, the original signal sampled by the sampling frequency is sampled by a sub-sampling frequency ($f_S/2$) of one half of the sampling frequency ($f_S$) as shown in FIG. 2, and the sampling point in each scanning line is offset horizontally by $P_H/2$ ($1/f_S$). As a result, the amount of data can be compressed to one half.

The video signals sub-sampled in this way are DCT-converted in units of blocks of 8×8 pixels by the DCT circuit 4. Further, the DCT coefficients obtained by the DCT-conversion are scanned according to the quantization level in the adaptive quantization circuit 5, and the DCT coefficient is quantized by the adaptive quantization circuit 5 by said quantization level on the basis of visibility which will be described later. The quantized DCT coefficient is encoded by the variable-length encoding circuit 6 which performs variable-length encoding, such as Huffman encoding.

Next, a description will be given of the quantization levels of the adaptive quantization circuit 5 in the above-described embodiment.

Ordinary quantization levels correspond to a DCT block in which 8×8 pixels are arranged horizontally and vertically in a grid form. In this case, as shown in FIG. 4(A), the quantization levels are set so that the lower the frequency components which are easily visible and where the occurrence probability is high, the pixels are quantized precisely, and the higher the frequency components in which the occurrence probability is low, the pixels are quantized roughly.

In contrast, in this embodiment, as shown in FIG. 4(B), the quantization levels of the high-frequency components along the oblique direction is set to be small, and quantized precisely. Thus, it is possible to prevent the image quality from being deteriorated visually in spite of the fact that picture coding is performed.

That is, in this embodiment, since the spatial position of a corresponding pixel between the scanning lines is offset by $P_H/2$ by the above-described offset-sub-sampling as shown in FIG. 2, the occurrence probability of the high-frequency components is higher in comparison with a case in which no offset-sub-sampling is performed. The experiment results show that the high-frequency components are easily visible and contribute improved image quality. The high-frequency components will be explained with reference to the two-dimensional spatial frequency characteristic diagram shown in FIG. 3. The frequency components between the Nyquist frequency ($f_S/4$) and the filtering cut-off frequency $f_p$ in the input range with respect to the sampling frequency ($f_S/2$) are folded as shown in the figure. The folded components appear in high frequencies along the oblique direction in FIG. 4(B) and improve the sharpness of the image.

Accordingly, in this embodiment, in order for the high-frequency components not to be lost in the quantization step, the high-frequency components, in particular, along the oblique direction are also precisely quantized in the same degree as those of the medium-frequency components in FIG. 4(A) on the basis of the visibility on the display screen of each frequency component discriminated by orthogonal transform as described above. As a result, the above folded components are stored.

Also, the above-described quantization levels shown in FIG. 4(B) are set on the basis of the experiment described below.

Figure 5:
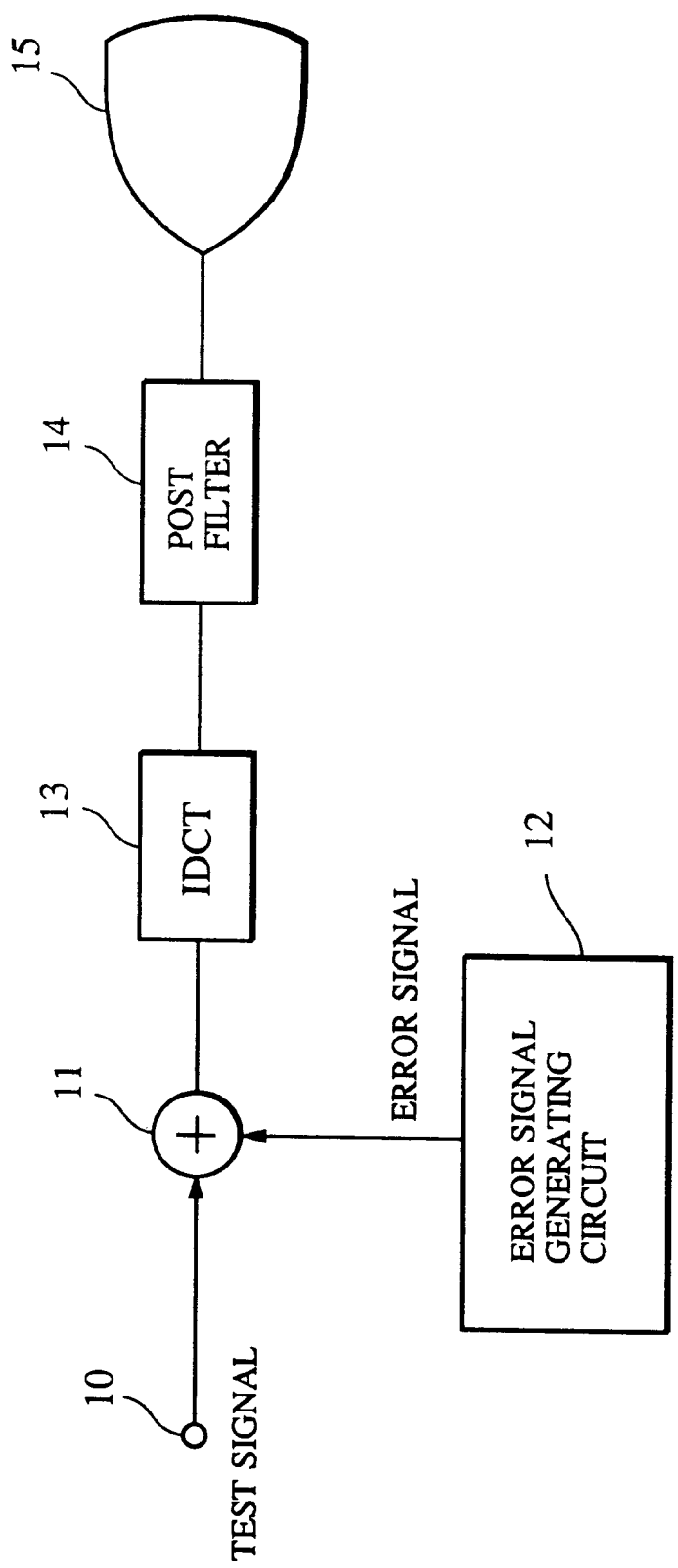
FIG. 5 is a block diagram illustrating the construction of an evaluation experiment apparatus used to set the quantization levels of the present invention.

That is, as shown in FIG. 5, a flat image is offset-sub-sampled, a test signal corresponding to the DCT coefficient obtained by DCT-conversion is supplied to an adder 11 via an input terminal 10 where a predetermined error signal supplied from an error signal generating circuit is added and the signal is reverse converted to a signal which is offset-sub-sampled by a reverse DCT-converter 13, and restored n,R to the original signal before it is offset-sub-sampled by performing an interpolation operation by a post filter 14, and the signals are displayed on a display apparatus 15. In this embodiment, each frequency component after DCT-conversion is selected in sequence as an error signal in such a construction, and the visibility of each of those frequency components on the display apparatus is evaluated. Each quantization level is set on the basis of the result of the evaluation.

As described above, since the quantization level in this embodiment is optimized on the basis of the visibility with respect to each frequency component discriminated by DCT-conversion, it is possible to quantize and encode high-frequency components, which are visually with a high degree of accuracy.

The reading scan in the DCT circuit 4 is what is commonly called a zigzag scan indicated by the alternately long and short dash line in the case of FIG. 4(A). In this embodiment, as indicated by the alternately long and short dash line in FIG. 4(B), DCT coefficients are read out sequentially in descending order of quantization levels set as described above.

As a result, since the probability that the DCT coefficient of the components which are roughly quantized will be "0" is high, the later the read out, the probability is likely to become high that the DCT coefficient will be "0". When "0" runs are continued, the components are compressed by an escape code, it is possible to increase the compression rate even more during the variable-length encoding at the later stage. Of course, the reading scan method is not limited to that shown in FIG. 4(B).

Since the input video signals are offset-sub-sampled in this embodiment, and since the signals are compressed by using adaptive quantization and variable-length encoding, it is possible to realize still higher-level picture coding.

Also, in this embodiment, by setting the quantization levels in the adaptive quantization circuit according to the visibility on the basis of the above-described experiment, the high-frequency components which are easily visible, generated by, in particular, offset-sub-sampling, can be effectively quantized, and input signals of a wide band can be compressed with a high degree of accuracy.

Figure 6:
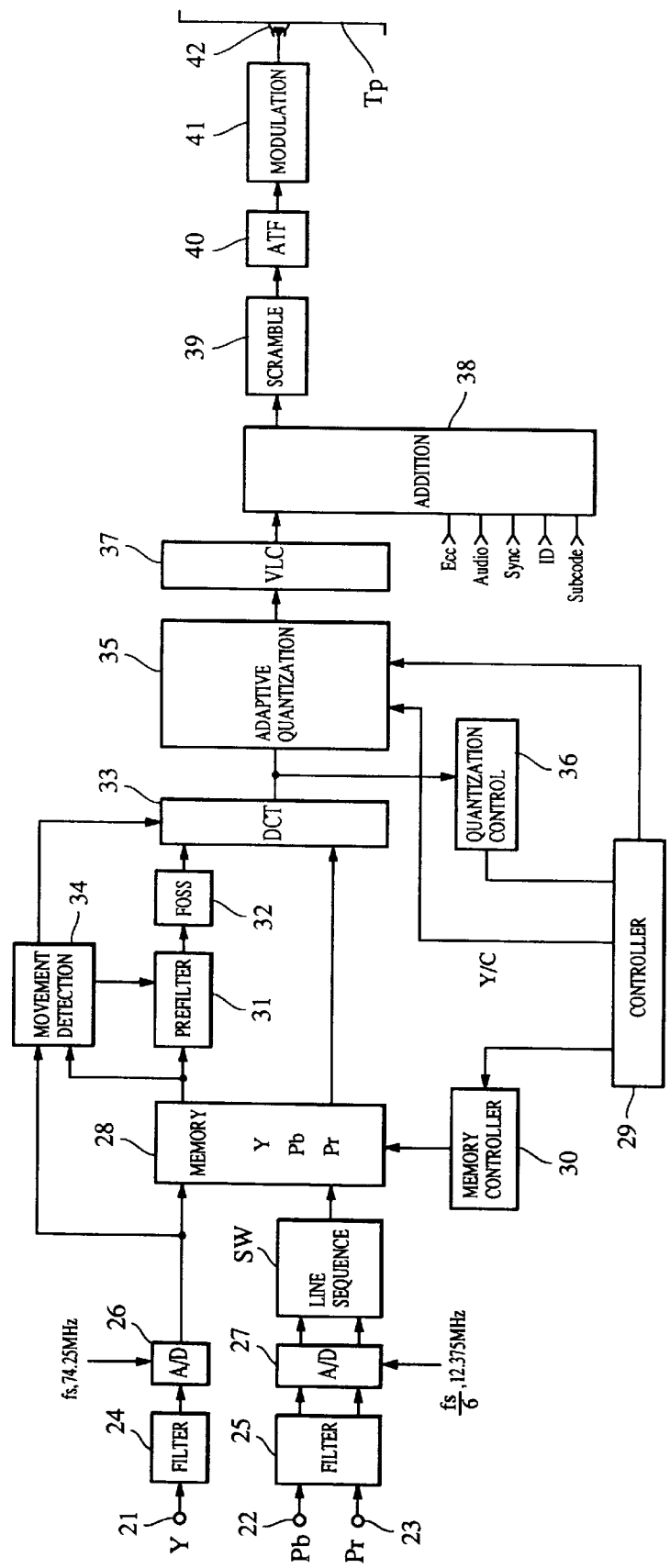
FIG. 6 is a block diagram illustrating another embodiment of the present invention.

Next, a description will be given of a second embodiment in which the picture coding apparatus of the present invention is applied to a digital VTR with reference to FIG. 6.

The digital VTR in this second embodiment compresses HD-compatible video signals having 4:2:2 components, 2:1 interlace of a field frequency 60 Hz, the band: approximately 1.2 Gbps (luminance signal Y: 600 Mbps, color difference signal: 600 Mbps ($P_b$: 300 Mbps, $P_r$: 300 Mbps)) into approximately 50 Mbps and encode the signals.

The HD-compatible luminance signal Y and color difference signals $P_b$ and $P_r$ are supplied to input terminals 21, 22 and 23, respectively, in this second embodiment. These signals are filtered by filters 24 and 25 to bands (the luminance signal: 20 to 30 MHz) in conformity with respective broadcast standards.

The filtered signals are supplied to the A/D converters 26 and 27. The luminance signal is sampled at a sampling frequency of 74.25 MHz and digitized, and the color difference signals $P_b$ and $P_r$ are sampled at a sampling frequency (12.375 MHz), one sixth of the above sampling frequency, and digitized, and thus compressed to approximately one sixth of the luminance signal.

As a result, for input signals in this embodiment, the luminance signal per one frame is formed into 1920 horizontal pixels×1040 vertical pixels, and the color difference signals $P_b$ and $P_r$ are formed into 320 horizontal pixels×520 vertical pixels, respectively. The luminance signal is temporarily stored in units of one frame in a memory circuit 28.

The above color difference signals are converted in sequence into a line sequence signal by a line sequence circuit Sw and supplied to the memory circuit 28. As a result, the luminance signal and color difference signal of 6:1:0 components are stored in the memory circuit 28.

The writing and reading operation of the memory circuit 28 is controlled by a memory controller 30 which is controlled by a controller 29. The luminance signal is read in such a way that a block of 16×8 pixels is assumed to be a minimum unit, and six blocks are read at a time. For the color difference signals, one DCT block (8×8 pixels) of the color difference signal $P_b$ and that of $P_r$ which are at the same position on the screen as the six blocks of the luminance signals are read at a time.

The memory controller 30 shuffles and reads the luminance signals and the color difference signals in units of six blocks of luminance signals and two DCT blocks of the color difference signals. The luminance signals which are shuffled and read are supplied to a prefilter 31 which is explained with reference to the embodiment described earlier where folded components along the oblique direction are removed, after which the signals are supplied to a field offset sub-sampling (FOSS) circuit 32 for offsetting pixels in the odd-number field scanning lines and pixels in the even-number field scanning lines corresponding to the former pixels by $P_H/2$.

The pixels are sub-sampled by the FOSS circuit 32 by a sampling frequency ($f_S/2$), one half of the above-described sampling frequency ($f_S$), and thus the amount of data is compressed to one half. As a result, each of the blocks is formed into the size of a DCT block.

The luminance signals subsampled in this way are supplied to a DCT circuit 33 where the signals are DCT-converted.

On the other hand, the color difference signals re a d out from the memory circuit 28 are read out following the read out of the luminance signals and supplied to the DCT circuit 33 where each of the color difference signals is DCT-converted.

The luminance signals read out from the memory circuit 28 and the luminance signals of a previous frame supplied to the memory circuit 28 are supplied to a movement detection circuit 34. This circuit detects the presence or absence of the movement of the macro block of each frame on the basis of the difference between the supplied luminance signals of each frame and supplies the detection output to the prefilter 31 and the DCT circuit 33.

Figure 7B:
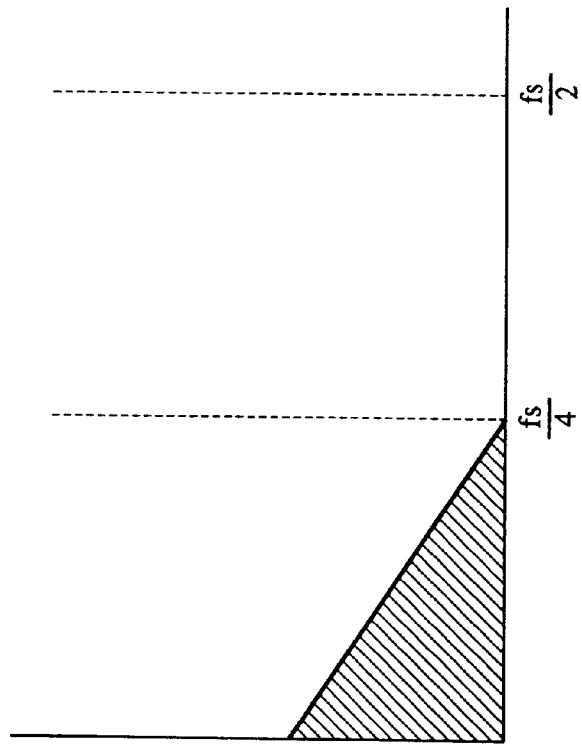
FIG. 7(B) shows the frequency characteristic of the prefilter when there is no movement.
Figure 7A:
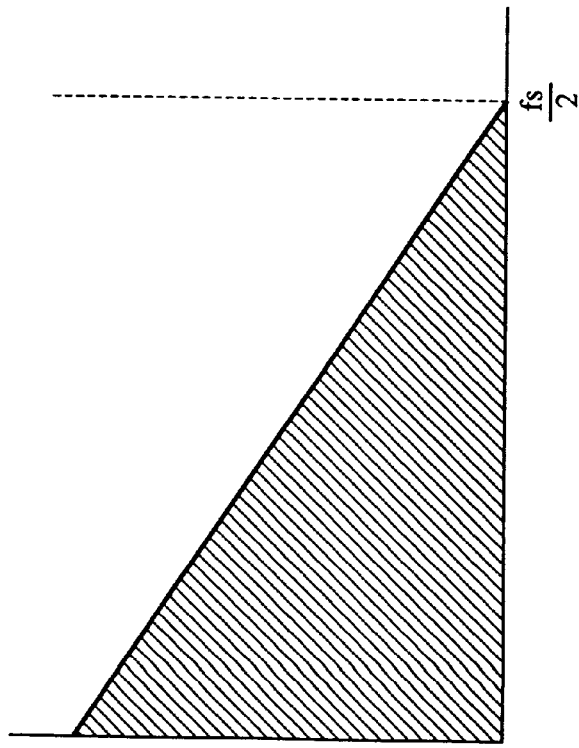
FIG. 7(A) shows the frequency characteristic of a prefilter in the embodiment shown in FIG. 6 when there is movement.

The filter characteristic of the prefilter 31 is variably set according to the movement of the subject macro block, which movement is based on the detected output. When there is no movement, the frequency characteristic thereof is set as shown in FIG. 7(A), and when there is movement, the frequency characteristic is set in such a way that the higher frequency components are removed as shown in FIG. 7(B). Thus, it is possible to effectively remove the folded components which occur when there is movement and to improve the image quality of a moving image.

The DCT circuit 33 DT-convert s each luminance signal and each color difference signal on the basis of the above detection output in units of DCT blocks of 8×8 pixels in correspondence with the frame or 8×4×2 pixels in correspondence with the field, and performs the same reading scan as in the embodiment described earlier in order to read out the DCT coefficient.

According to this second embodiment, since the detection operation is performed by using pixels (16×8 pixels) larger than the primary number of pixels (8×8 pixels) in the DCT block when the movement is detected by the movement detection circuit 34, it is possible to realize even more accurate movement detection.

The luminance signals and the color difference signal which are DCT-converted are supplied in sequence to an adaptive quantization circuit 35 where the quantization subject is quantized to a luminance signal or a color difference signal at a quantization step width on the basis of predetermined quantization levels based on quantization control which will be described later.

That is, in the adaptive quantization circuit 35, a quantization level is selected depending upon whether the signal to be DCT-converted by the memory controller 30 is a luminance signal or a color difference signal. The luminance signal is quantized on the basis of the quantization levels shown in FIG. 4(B), and the color difference signal is quantized on the basis of the quantization levels shown in FIG. 4(A).

The DCT coefficient output from the DCT circuit 33 is supplied to a quantization level control circuit 36. In this second embodiment, the quantization levels in the adaptive quantization circuit 35 are switched so that the amount of data after five macro blocks are quantized becomes nearly constant.

The above quantization levels are prestored in a table. The memory controller 30 is operated in linkage with the read out by the memory controller 29, and the table is selectively specified in accordance with the quantization level control signal so that the quantization level with respect to the luminance signal and that with respect to the color difference signal are switched.

The luminance signal and the color difference signal which are quantized as described above are supplied to a variable-length encoding circuit 37 where the signals are encoded by using, for example, two-dimensional Huffman codes. In this second embodiment, the signals are compressed into the amount of data of approximately 50 Mbps in the above-described encoding step. Thereafter, the encoded luminance signals and color difference signals are supplied to an addition circuit 38 where an error correction code (ECC), an audio signal, an ID signal, a subcode signal, Sync or the like are added.

Further, the signal to which the above signals are added is scrambled by a scramble circuit 39, delimited by an ATF circuit 40 in units of 24 bits, one bit is applied to the head thereof for ATF use and converted into 25 bits, and further converted into a recording code sequence by interleaved NRZI (non-return-to-zero inverted recording) in a modulator 41, after which they are recorded on a recording medium, such as magnetic tape $T_P$, via a magnetic head 42.

According to the digital VTR constructed as described above, it is possible to perform still higher-level picture coding apparatus by performing field offset sub-sampling before DCT conversion.

Also, in this second embodiment, it is possible to store high-frequency components which are visually important after quantization by setting the quantization levels with respect to the luminance signal according to the visibility.

In addition, in this second embodiment, it is possible to secure the amount of data when there is no movement while suppressing the occurrence of folding when there is movement by variably setting the frequency characteristic of the prefilter on the basis of the presence or absence of the movement of the macro block to be quantized. Such an effect becomes greater even more when, in particular, the sampling frequency is lowered to, for example, approximately 40 MHz, or the pass band of the filter 24 is widened to, for example, approximately 30 MHz.

It is also possible to simplify the circuitry by sharing the above-described movement detection for switching a prefilter with the movement detection in the DCT conversion.

Although in the above-described second embodiment, only the luminance signal is field-offset-sub-sampled, the color difference signal may also be field-offset-sub-sampled. In this case, the frequency characteristic and the operating characteristic of the prefilter 31 and the FOSS circuit 32 may be switched.

Also, it is possible to adaptively switch the field-offset-sub-sampling with respect to the color difference signal, for example, depending upon the presence or absence of the movement.

Although in the above-described second embodiment the memory circuit 28 is disposed in the stage anterior to the FOSS circuit 32, the memory circuit 28 may be disposed in the stage posterior to the FOSS circuit 32. In this case, since it is possible to make the reading size of the luminance signal and that of the color difference signal the same, the reading operation becomes easier, and the capacity of the memory circuit 28 can be decreased.

Figure 8:
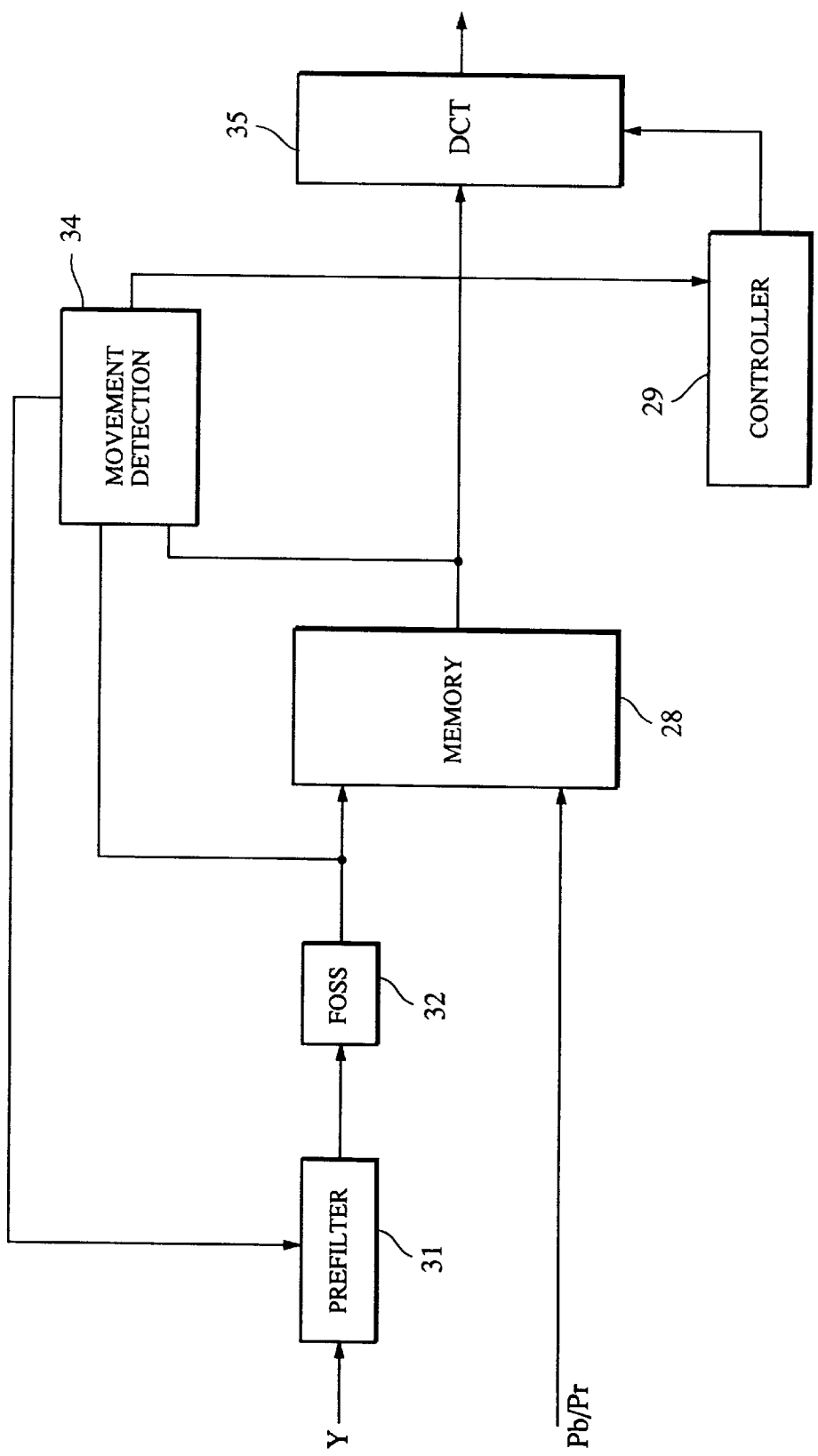
FIG. 8 is a block diagram illustrating the embodiment of the essential portion of FIG. 6.

That is, as shown in FIG. 8, the memory circuit 28 may be disposed in the stage posterior to the prefilter 31 and the FOSS circuit 32 so that the subsampled luminance signal Y and the color difference signals $P_b$ and $P_r$ which are formed into a line sequence are stored. In this case, since the luminance signal and the color difference signal have been formed into a DCT block size of 8×8 pixels, it is possible to decrease the capacity of the memory circuit 28.

In this case, the movement detection for DCT becomes a movement detection based on the difference between the processing frame and the next frame, and the movement detection for the prefilter becomes a movement detection based on the difference between the processing frame and the previous frame. However, when the memory circuit 28 is disposed in the stage anterior to the prefilter 31 as in the second embodiment described earlier, both movement detections become a movement detection based on the processing frame and the next frame, which is preferable.

As is clear from the foregoing, according to this third embodiment, it is possible to realize still higher efficiency compression by compressing signals compressed (thinned) by offset-sub-sampling based on DCT transform, adaptive quantization and variable-length encoding.

Also, according to this third embodiment, since the high-frequency components which are generated by the offset-sub-sampling can be encoded without being lost in the quantization step, it is possible to faithfully compress input signals in a wide range.

In addition, according to this third embodiment, since the the DCT coefficient with a narrow quantization step width is read out with the highest priority, the later the read out, the greater the probability becomes that the coefficient after quantization will be "0". Thus, it is possible to increase the compression rate in the variable-length encoding in later steps.

According to this third embodiment, since the band of the filtering means is variably set depending upon the presence or absence of movement, it is possible to increase the image quality of the encoded signals when there is movement.

A picture coding apparatus of a fourth embodiment of the present invention will be explained below.

Figure 9:
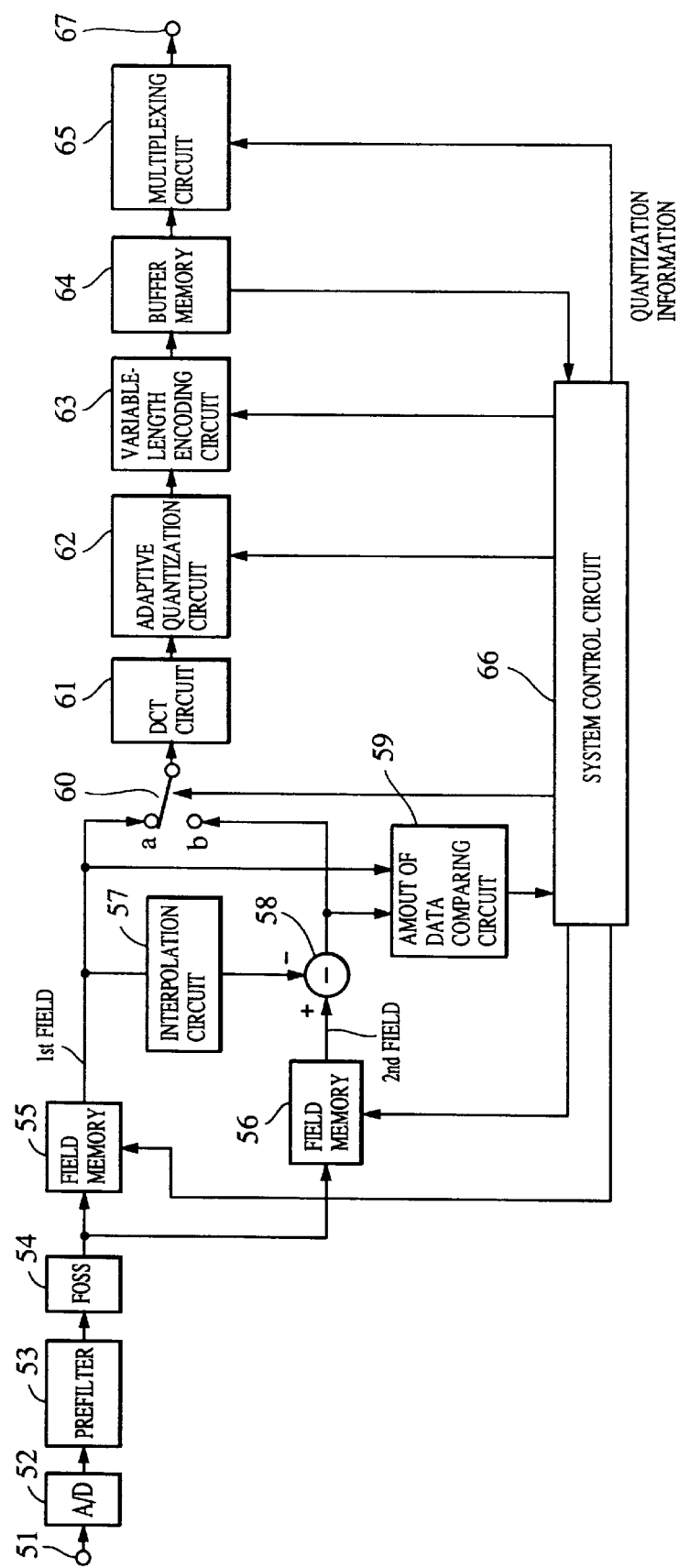
FIG. 9 is a block diagram illustrating the construction of a image encoding apparatus in accordance with the embodiment of the present invention.

FIG. 9 is a block diagram illustrating the construction of a picture coding apparatus in accordance with the fourth embodiment of the present invention.

In FIG. 9, reference numeral 51 denotes an input terminal to which an analog image signal is applied; reference numeral 52 denotes an A/D conversion circuit for converting an analog image signal into a digital signal; reference numeral 53 denotes a prefilter for attenuating the two-dimensional spatial frequency range in the image data output from the A/D conversion circuit 52; reference numeral 54 denotes a field offset sub-sampling circuit (hereinafter referred to as an FOSS) for field offset sub-sampling the signals output from the A/D conversion circuit 52; reference numeral 55 denotes a field memory for storing image data of a first field; reference numeral 56 denotes a field memory for storing image data of a second field; reference numeral 57 denotes an interpolation circuit; reference numeral 58 denotes a subtraction circuit; reference numeral 59 denotes an amount of data comparison circuit; reference numeral 60 denotes a selection switch; reference numeral 61 denotes a DCT circuit 61; reference numeral 62 denotes an adaptive quantization circuit; reference numeral 63 denotes a variable-length encoding circuit; reference numeral 64 denotes a buffer memory; reference numeral 65 denotes a multiplexing circuit for multiplexing image data onto the quantization information data; reference numeral 66 denotes a system control circuit for controlling the field memories 55 and 56, the selection switch 60, the adaptive quantization circuit 62, and the variable-length encoding circuit 63; and reference numeral 67 denotes an output terminal for outputting the output from the multiplexing circuit 65.

The operation of the encoding apparatus constructed as described above will be explained in detail.

Analog image signals (television signals) are input to the input terminal 51. The signals are converted into digital television signals of, for example, 8 bits by the A/D conversion circuit 52. A predetermined two-dimensional spatial frequency range is attenuated by the prefilter 53, and offset-sub-sampled by the FOSS 54.

The offset sub-sampling will now be explained.

Figure 10:
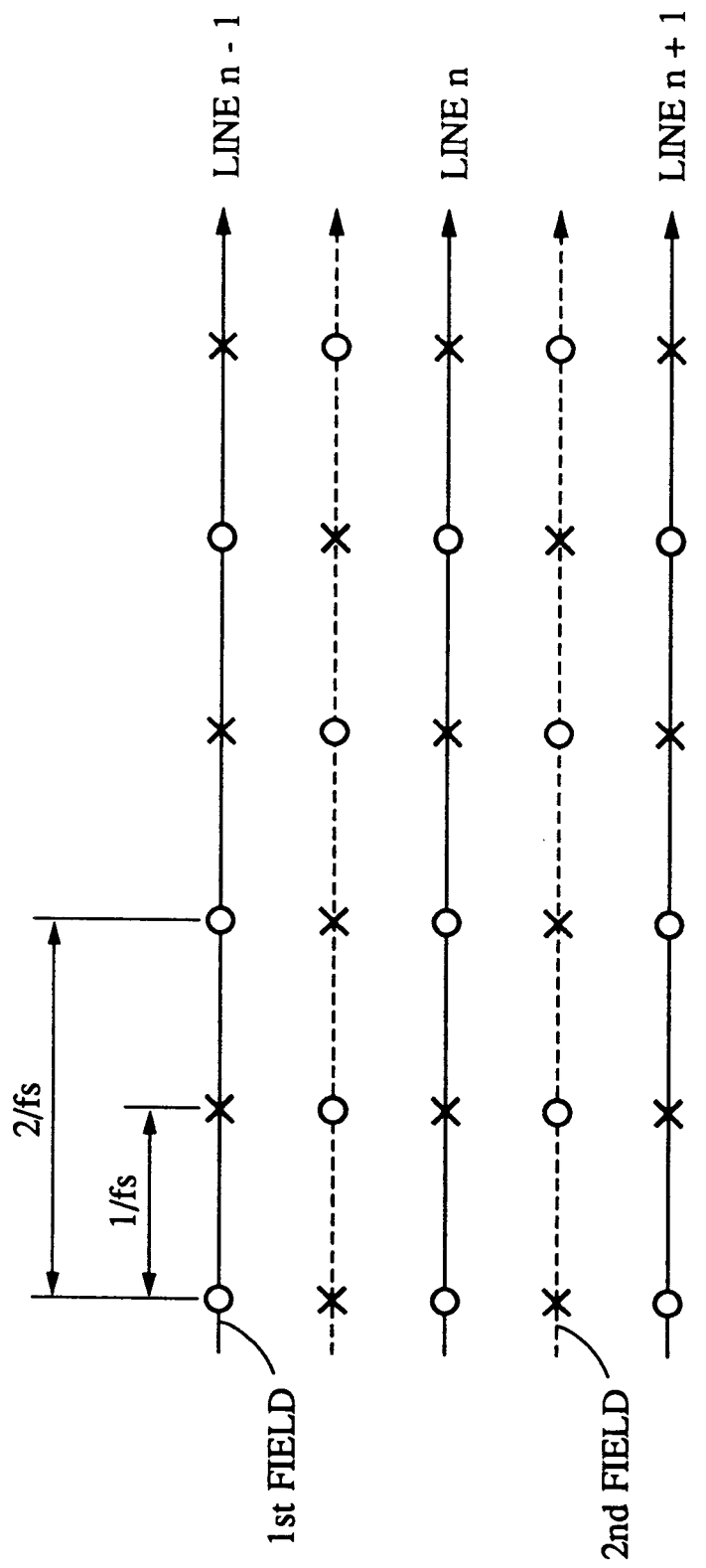
FIG. 10 is an illustration of a sampling pattern of field offset sampling.

The offset sub-sampling is performed in accordance with patterns shown in FIG. 10. In FIG. 10, the solid line indicates a scanning line of the first field, and the dashed line indicates a scanning line of the second field. It is assumed in this embodiment that the input signals are television signals which are interlaced by two to one. The television signals output from the prefilter 53 are sampled in a grid form at points indicated by ○ and X marks. The FOSS 54 transmits only sampling points (pixel data) of ○ marks ($f_S$ is the sampling frequency). In this way, the pixels are extracted in a grid form. The sampling points (X marks) which were not transmitted can be transmitted without decreasing the horizontal and vertical resolutions by interpolating the points by an interpolation filter. Although the resolution along the oblique direction deteriorates, this deterioration is not so much since the resolution along the oblique direction of the visual characteristic of the human being is small in comparison to the horizontal and vertical resolutions. The characteristic of the prefilter 53 is designed so as to attenuate the spatial frequency along the oblique direction so that the folding distortion by the FOSS 54 is prevented. The sampling frequency $f_S$ is designed so as to be slightly greater twice the transmission band width of the television signal. For example, in the case of HD television signals, since the transmission band is from 20 to 30 MHz, the sampling frequency is set at 74.25 MHz.

The data of the first field of the image data subsampled by the FOSS 54 is input to the field memory 55, and the data of the second field of the image data is stored the field memory 56.

Next, the system control circuit 66 reads out the block data of 8×8 pixels from the field memory 55, and outputs it to the DCT circuit 61 via the selection switch 60 (the "a" terminal side). The above block data is input to the interpolation circuit 57 and the amount of data comparison circuit 59. The operation of the amount of data comparison circuit 59 will be described later.

Figure 12:
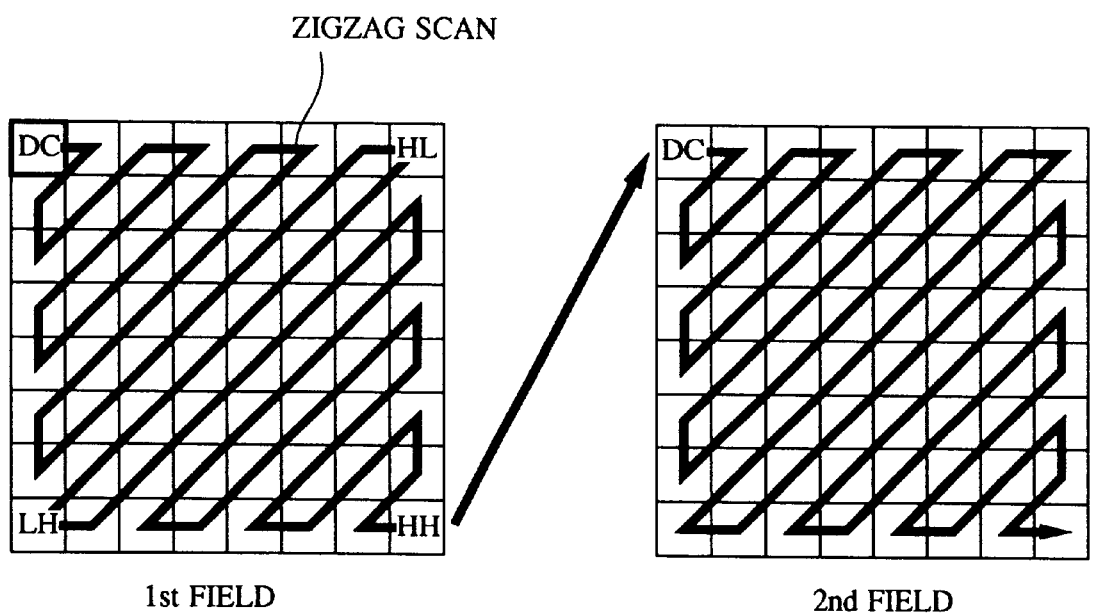
FIG. 12 is an illustration of the conversion of the block data into a one-dimensional data sequence and the unit at which variable-length encoding is performed in accordance with the embodiment of the present invention.

The block data input to the DCT circuit 61 is converted into DCT coefficients, and quantized by the adaptive quantization circuit 62. The quantized data, as shown in FIG. 12, is scanned zigzag, and the data converted into a one-dimensional data sequence is input to the variable-length encoding circuit 63.

When the quantization operation for (8×8) blocks of the first field is terminated, and when the quantized data is converted into a one-dimensional data sequence and input to the variable-length encoding circuit 63, the block data of (8×8) pixels of the second field is read out from the field memory 56.

Figure 11:
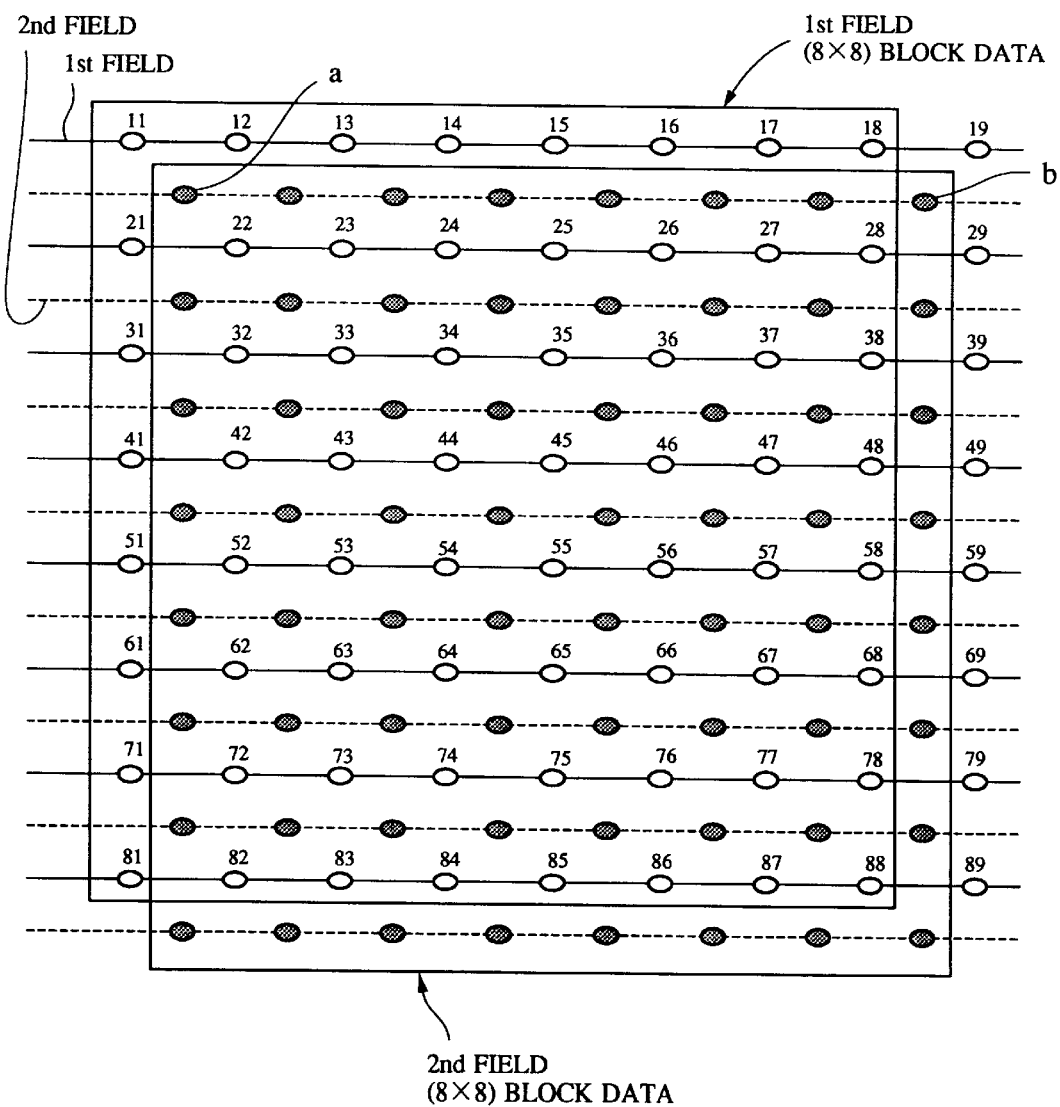
FIG. 11 is a diagram illustrating a method of reading block data of a second field from a field memory in accordance with the embodiment of the present invention.

The position at which the block data of (8×8) pixels is read out from the field memory 56 will now be explained. (8×8) block data at the position corresponding to that of the (8×8) block data of the first field read out from the field memory 55 is read out from the field memory 56, that is, the image data at the position shown in FIG. 11 is read out.

The block data read out from the field memory 56 is input to the subtraction circuit 58 where the data is subtracted from the prediction data corresponding to the block data of the second field generated by the block data of the first field output from the interpolation circuit 57.

The method of calculating prediction data will be explained with reference to FIG. 11. 64 pixels, which are (8×8) block data of the first field, are represented by reference numerals shown in FIG. 11. When, for example, pixel data at a position corresponding to the "a" position of the second field is predicted, the average of four pixel data at positions 11, 12, 21 and 22 in FIG. 11 is calculated, and it is assumed to be the prediction data at position "a". When pixel data at a position corresponding to the "b" position of the second field is predicted, the average of four pixel data at positions 18, 19, 28 and 29 in FIG. 11 is calculated, and it is assumed to be the prediction data at position "b". That is, the pixel data of the adjacent blocks are also read out from the field memory 55 in order to calculate the prediction data.

The above-described method of calculating prediction data is only an example. When the pixel data in the end of all the pixel data is predicted, prediction may be possible by using two pixel data or one pixel data, or by a method in which dummy data (gray data) is added for prediction.

Returning to the explanation of the operation of FIG. 9, the difference value output from the subtraction circuit 58 is input to the DCT circuit 61 via the amount of data comparison circuit 59 and the selection switch 60 (the "b"

terminal side), is converted into DCT components and quantized by the adaptive quantization circuit 62. The quantized block data, as shown in FIG. 12, is scanned zigzag, and data which is converted into a one-dimensional data sequence is input to the variable-length encoding circuit 63.

When the one-dimensional data sequence of the first and second fields, rearranged as shown in FIG. 12, is input to the variable-length encoding circuit 63, the variable-length encoding operation is performed. In this embodiment, two-dimensional Huffman encoding is performed. For example, data which have consecutive zeros (RUN) and values (LEVEL) other than zero which follow the zeros and which is a combination of a high occurrence probability is assigned with a short code and data of a low occurrence probability is assigned with a long code.

The encoded data which is variable-length encoded as described above is input to the buffer memory 64. The image data which is converted into a fixed rate is output from the buffer memory 64 to the multiplexing circuit 65. The multiplexing circuit 65 multiplexes the quantization information data (described later) output from the system control circuit 66 onto the image data, and the data is output from an output terminal 67.

That is, in this embodiment, when the quantization operation for (8×8) block data of the first field is terminated, the (8×8) block data of the second field is performed. When the block data of the first and second fields, converted into a one-dimensional data sequence, is input to the variable-length encoding circuit 63, a variable-length encoding operation is performed, and the encoded data is output. By repeatedly performing the above-described operation, the encoding operation for image data of one frame is performed.

Next, the adaptive quantization circuit 62 in accordance with this embodiment will be explained.

The quantization width of the adaptive quantization circuit 62 is switched depending upon the amount of stored data of the buffer memory 64. To prevent the buffer memory 64 from overflowing or underflowing because the use of variable-length encoding causes the data rate after encoding to change depending upon the image quality, the system control circuit 66 controls so that when the amount of data in the buffer memory 64 increases, the quantization width at quantization time is increased in the adaptive quantization circuit 62, and when the amount of data in the buffer memory 64 decreases, the quantization width is decreased.

Figure 13:
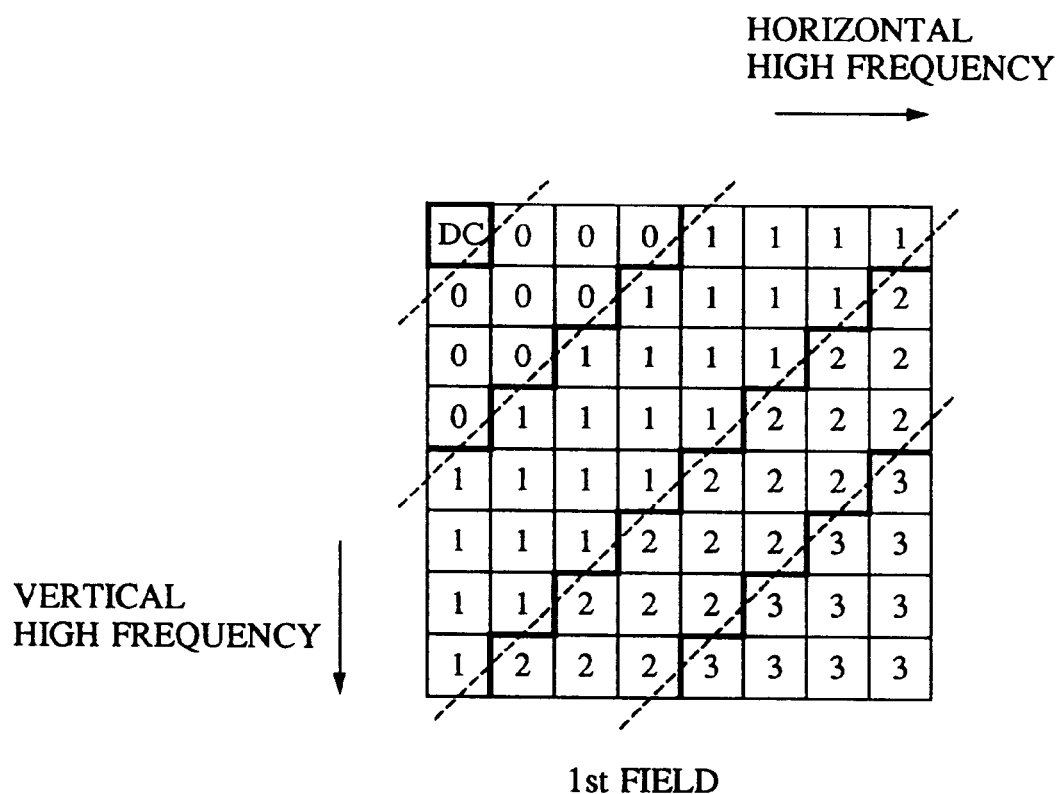
FIG. 13 is an illustration of a quantization table of image data of the first field in accordance with the embodiment of the present invention.

The quantization levels are further different even in the blocks. FIGS. 13 and 14 show that the orthogonal components of the (8×8) block data output from the DCT circuit 61 are divided into four bands with the DC components being removed.

The numbers in FIGS. 13 and 14 indicate the number of each band. Generally, the visual sense of the human being is sensitive to the distortion in the low frequency components, and insensitive to the distortion in the high frequency components. Therefore, by performing quantization such that the higher the frequencies, the greater the quantization level becomes, it becomes possible to improve the compression rate while decreasing the visual deterioration. Thus, the quantization level is controlled for each band shown in FIGS. 13 and 14. That is, number 0 in FIGS. 13 and 14 indicates that the quantization level is decreased least, and the greater the number, the greater the quantization width becomes. In this embodiment, number 3 indicates that the quantization width is greatest.

In this embodiment, as shown in FIGS. 14(a), 14(b) and 14(c), three types of quantization tables are adaptively switched by the system control circuit 66 during the operation for the second field.

The operation for switching the quantization tables will be explained below in detail.

The amount of block data of the first field and the amount of difference block data of the second field, a pair which is to be variable-length encoded as described above, are compared with each other by the amount of data comparison circuit 59. The quantization table (see FIG. 14) is selected according to the difference between the amounts of the above data.

(1) When the amount of difference block data of the second field is smaller than the amount of block data of the first field by a predetermined value A, it is determined that the data is of almost a still image. The quantization table of FIG. 14(c) is selected, and quantization of a small quantization width is performed.

(2) When the amount of difference block data of the second field is smaller than the amount of block data of the first field by a predetermined value B, but not smaller by the predetermined value A (A>B), the quantization table of FIG. 14(a) is selected.

(3) When the comparison is other than (1) and (2) above, it is determined that the correlation between the first field and the second field is low, for example, an image of a rapid movement. The quantization table of FIG. 14(b) is selected, and quantization of a large quantization width is performed.

The above-described operation makes it possible to prevent flicker from occurring when switching between the first field and the second field because the image quality differs when the images of the first and second fields are decoded.

Although in this embodiment three types of quantization tables are prepared, the quantization tables are not limited to the three types, and four or more types of them may be prepared.

Information data (quantization table Nos. and the like) on the quantization width is output to the display apparatus by the system control circuit 66.

Although in this embodiment the size of blocks is 8 pixels horizontally and 8 pixels vertically, the size is not limited to this example.

As described above, according to the present invention, it is possible to realize picture coding of image signals while maintaining high image quality without using a complex circuit.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation, so as to encompass all such modifications and equivalent structures and functions.

What is claimed is:

1. An image encoding apparatus comprising:
   a) input means for inputting image data;
   b) offset-sampling means for adaptively offset-sampling the image data;
   c) transforming means for transforming the offset-sampled image data and non-offset-sampled image data into frequency component data, on a basis of a block comprising a predetermined number of pixels; and
   d) quantizing means for quantizing the frequency component data;

wherein said quantizing means performs weighting when quantizing processing in accordance with the frequency component data, wherein the weighting of high frequency component data of the offset-sampled image data is different from that of the non-offset-sampled image data so that reducing of high frequency component data of the offset-sampled image data is less than that of the non-offset-sampled image data.

2. An apparatus according to claim 1, further comprising filtering means for filtering the image data and outputting the filtered image data to said offset-sampling means.

3. An apparatus according to claim 2, further comprising detecting means for detecting a movement of the image data, wherein said filtering means sets a filtering characteristic in accordance with an output of said detecting means.

4. An apparatus according to claim 3, wherein said transforming means comprises a field transforming mode for transforming by field, and a frame transforming mode for transforming by frame, and wherein said transforming means sets the transforming mode on the basis of the output of said detecting means.

5. An apparatus according to claim 1, wherein the image data comprises luminance data and color difference data, the luminance data is offset-sampled, and the color difference data is not offset-sampled.

6. An apparatus according to claim 1, further comprising encoding means for encoding the quantized image data.

7. An apparatus according to claim 6, further comprising recording means for recording the encoded image data on a recording medium.

8. An image encoding apparatus comprising:
a) input means for inputting image data which is interlaced data;
b) offset-sampling means for offset-sampling the image data; and
c) encoding means for encoding the image data processed by said offset-sampling means,
wherein said encoding means intra-picture codes a first field, and inter-picture codes a second fields,
said encoding means comprising converting means for converting the image data processed by said offset-sampling means into frequency component data and quantizing means for quantizing the frequency component data, wherein said quantizing means performs weighting when quantizing processing in accordance with the frequency component data, and the weighting of the first field is fixed, and the weiqhtinq of the second field changes adaptively in accordance with the image data.

9. An apparatus according to claim 8, further comprising filtering means for filtering the image data and outputting the filtered image data to said offset-sampling means.

10. An apparatus according to claim 9, wherein said transforming means for transforming the image data on a basis of a block comprising a predetermined number of pixels and said quantizing means for quantizing the frequency component data on the basis of the block.

11. An image encoding method, comprising the steps of:
inputting image data;
adaptively offset-sampling the image data;
transforming the offset-sampled image data and non-offset-sampled image data into frequency component data, on the basis of a block comprising a predetermined number of pixels; and
quantizing the frequency component data,
wherein said quantizing step performs weiqhtinq when quantizing processing in accordance with the frequency component data, wherein the weighting of high frequency component data of the offset-sampled image data is different from that of the non-offset sampled image data so that reducing of high frequency component data of the offset-sampled image data is less than that of the non-offset-sampled image data.

12. An image encoding method, comprising the steps of:
inputting image data which is interlaced data;
offset-sampling the image data; and
encoding the offset-sampled image data, wherein said encoding step intra-picture codes a first field, and inter-picture codes a second fields,
said encoding step comprising a converting step of converting the image data by said offset-sampling step into frequency component data and a quantizing step of quantizing the frequency component data, and wherein said quantizing step performs weighting when quantizing processing in accordance with the frequency component data, and the weighting of the first field is fixed, and the weighting of the second field changes adaptively in accordance with the image.

* * * * *

UNITED STATES PATENT AND TRADEMARK OFFICE
CERTIFICATE OF CORRECTION

PATENT NO.  : 6,137,835
DATED       : October 24, 2000
INVENTOR(S) : Shinichi Yamashita et al.

It is certified that error appears in the above-identified patent and that said Letters Patent is hereby corrected as shown below:

TITLE PAGE, ITEM [56], REFERENCES CITED, U.S. PATENT DOCUMENTS,

"Waldman et al." should read -- Fukuda --.

Sheet 9,
Figure 9, "AMOUT" should read -- AMOUNT --.

Column 3,
Line 50, "1 to 8." should read -- 1 through 8. --;
Line 64, "subsampling" should read -- sub-sampling --;
Line 65, "supress n,R" should read -- suppresses --.

Column 5,
Line 6, "n.R" should be deleted;
Line 8, "15. In" should read -- 15. ¶ In --.

Column 6,
Line 31, "offset" should read -- offset --;
Line 41, "subsampled" should read -- sub-sampled --;
Line 44, "re a d" should read -- read --.

Column 7,
Line 1, "DT-convert s" should read -- DCT-converts --.

Column 8,
Line 37, "subsampled" should read -- sub-sampled --;
Line 64, "the" should be deleted.

Column 9,
Line 20, "offset" should read -- offset --;
Line 21, "offset" should read -- offset --;
Line 49, "offset" should read -- offset --;
Line 50, "offset" should read -- offset --.

Column 10,
Line 10, "subsampled" should read -- sub-sampled --;
Line 12, "the" (third occurrence) should read -- in the --.

UNITED STATES PATENT AND TRADEMARK OFFICE
CERTIFICATE OF CORRECTION

PATENT NO. : 6,137,835
DATED : October 24, 2000
INVENTOR(S) : Shinichi Yamashita et al.

It is certified that error appears in the above-identified patent and that said Letters Patent is hereby corrected as shown below:

Column 12,
Line 37, "apparatus" should read -- apparatus 15 --.
Line 67, "data;" should read -- data, --.

Column 13,
Line 39, "fields," should read -- field, --.

Column 14,
Line 2, "weighting" should read -- weighting --;
Line 21, "weightinq" should read -- weighting --;
Line 34, "fields," should read -- field, --.

Signed and Sealed this

Thirteenth Day of November, 2001

Attest:

NICHOLAS P. GODICI
Attesting Officer
Acting Director of the United States Patent and Trademark Office